US009860681B2

(12) United States Patent
Britt et al.

(10) Patent No.: US 9,860,681 B2
(45) Date of Patent: Jan. 2, 2018

(54) SYSTEM AND METHOD FOR SELECTING A CELL CARRIER TO CONNECT AN IOT HUB

(71) Applicant: Afero, Inc., Los Altos, CA (US)

(72) Inventors: Joe Britt, Los Altos, CA (US); Shin Matsumura, Los Altos, CA (US); Houman Forood, San Francisco, CA (US)

(73) Assignee: Afero, Inc., Los Altos, CA (US)

( * ) Notice: Subject to any disclaimer, the term of this patent is extended or adjusted under 35 U.S.C. 154(b) by 0 days.

(21) Appl. No.: 14/590,708

(22) Filed: Jan. 6, 2015

(65) Prior Publication Data

US 2016/0198465 A1 Jul. 7, 2016

(51) Int. Cl.
*H04W 4/00* (2009.01)

(52) U.S. Cl.
CPC .................... *H04W 4/008* (2013.01)

(58) Field of Classification Search
CPC .................... H04W 72/0453; H04W 4/008
See application file for complete search history.

(56) References Cited

U.S. PATENT DOCUMENTS

| 6,564,056 | B1 * | 5/2003 | Fitzgerald | ........... H04L 12/2803 340/5.1 |
| 6,930,598 | B2 * | 8/2005 | Weiss | ............. H04L 67/12 340/3.43 |
| 7,822,868 | B2 | 10/2010 | Gassewitz et al. | |
| 7,917,251 | B2 * | 3/2011 | Kressner | ............. G01R 22/063 320/109 |
| 8,391,299 | B2 * | 3/2013 | Schliserman | ....... H04L 12/2803 370/401 |
| 8,983,926 | B2 | 3/2015 | Cai et al. | |
| 8,992,228 | B2 | 3/2015 | Kostoff et al. | |
| 9,372,922 | B2 | 6/2016 | Shaashua et al. | |
| 9,462,041 | B1 | 10/2016 | Hagins et al. | |
| 2001/0045819 | A1 | 11/2001 | Harris et al. | |
| 2002/0037004 | A1 * | 3/2002 | Bossemeyer | ....... H04L 12/6418 370/356 |
| 2003/0066080 | A1 | 4/2003 | Kamieniecki | |

(Continued)

OTHER PUBLICATIONS

Final Office Action from U.S. Appl. No. 14/590,649, dated Oct. 4, 2017, 17 pages.

(Continued)

*Primary Examiner* — Nathan Mitchell
(74) *Attorney, Agent, or Firm* — Nicholson De Vos Webster & Elliott LLP

(57) ABSTRACT

A platform, apparatus and method for Internet of Things Implementations for selecting a cellular carrier. For example, one embodiment of a system comprises: an Internet of Things (IoT) hub comprising a network interface to couple the IoT hub to an IoT service through a cellular (cell) carrier, the IoT hub further comprising a local communication interface to communicatively couple the IoT hub to a plurality of IoT devices over local communication channels; cell carrier selection logic on the IoT hub to implement a set of rules to select between two or more cell carriers through which to connect the IoT hub to the IoT service, the rules being based, at least in part, on a cost associated with connecting to each of the two or more cell carriers and connectivity data associated with cell connections between the IoT hub and each of the two or more cell carriers.

16 Claims, 21 Drawing Sheets

(56) References Cited

U.S. PATENT DOCUMENTS

| | | | |
|---|---|---|---|
| 2003/0217110 A1* | 11/2003 | Weiss | H04L 67/12 709/207 |
| 2004/0009751 A1* | 1/2004 | Michaelis | H04W 88/06 455/62 |
| 2005/0059397 A1* | 3/2005 | Zhao | H04W 8/183 455/435.2 |
| 2005/0096753 A1 | 5/2005 | Arling et al. | |
| 2005/0148333 A1* | 7/2005 | Buckley | H04W 8/183 455/435.2 |
| 2005/0156730 A1 | 7/2005 | Chapman et al. | |
| 2006/0084417 A1* | 4/2006 | Melpignano | H04L 12/5692 455/418 |
| 2007/0061430 A1* | 3/2007 | Kim | H04L 12/2803 709/220 |
| 2007/0249372 A1* | 10/2007 | Gao | H04L 12/5855 455/466 |
| 2007/0287498 A1* | 12/2007 | Wang | G06Q 10/087 455/556.1 |
| 2008/0102815 A1* | 5/2008 | Sengupta | H04W 36/24 455/424 |
| 2008/0117922 A1* | 5/2008 | Cockrell | H04L 12/66 370/401 |
| 2008/0250441 A1 | 10/2008 | Sharma et al. | |
| 2011/0118896 A1 | 5/2011 | Holloway | |
| 2011/0189956 A1 | 8/2011 | Gandolfo | |
| 2011/0202910 A1 | 8/2011 | Venkatakrishnan et al. | |
| 2011/0205965 A1* | 8/2011 | Sprigg | G06F 9/4411 370/328 |
| 2011/0211584 A1* | 9/2011 | Mahmoud | H04L 12/2834 370/401 |
| 2012/0166610 A1 | 6/2012 | Doh et al. | |
| 2013/0130678 A1* | 5/2013 | Zanier | H04W 8/065 455/433 |
| 2013/0136455 A1 | 5/2013 | De et al. | |
| 2013/0263802 A1 | 10/2013 | Lee et al. | |
| 2014/0055261 A1 | 2/2014 | Su | |
| 2014/0098247 A1* | 4/2014 | Rao | H04W 4/20 348/207.1 |
| 2014/0176309 A1 | 6/2014 | Wang et al. | |
| 2014/0201089 A1 | 7/2014 | Ling | |
| 2014/0244001 A1 | 8/2014 | Glickfield et al. | |
| 2014/0268881 A1 | 9/2014 | Ku et al. | |
| 2014/0373040 A1 | 12/2014 | Lin et al. | |
| 2014/0376919 A1 | 12/2014 | Nykoluk et al. | |
| 2015/0006695 A1 | 1/2015 | Gupta | |
| 2015/0006719 A1 | 1/2015 | Gupta et al. | |
| 2015/0019710 A1 | 1/2015 | Shaashua et al. | |
| 2015/0019714 A1 | 1/2015 | Shaashua et al. | |
| 2015/0026001 A1 | 1/2015 | Gu et al. | |
| 2015/0058802 A1 | 2/2015 | Turaj et al. | |
| 2015/0099245 A1 | 4/2015 | Bouchard et al. | |
| 2015/0120000 A1 | 4/2015 | Coffey et al. | |
| 2015/0121470 A1 | 4/2015 | Rongo et al. | |
| 2015/0134761 A1 | 5/2015 | Sharma et al. | |
| 2015/0134954 A1 | 5/2015 | Walley et al. | |
| 2015/0156266 A1 | 6/2015 | Gupta | |
| 2015/0254349 A1 | 9/2015 | Sela | |
| 2015/0280479 A1 | 10/2015 | Levy et al. | |
| 2015/0341446 A1 | 11/2015 | Nguyen et al. | |
| 2015/0365217 A1 | 12/2015 | Scholten et al. | |
| 2015/0381776 A1 | 12/2015 | Seed et al. | |
| 2016/0007288 A1 | 1/2016 | Samardzija et al. | |
| 2016/0041534 A1 | 2/2016 | Gupta | |
| 2016/0065653 A1 | 3/2016 | Chen et al. | |
| 2016/0088049 A1 | 3/2016 | Seed et al. | |
| 2016/0095060 A1 | 3/2016 | Seddighrad et al. | |
| 2016/0112240 A1 | 4/2016 | Sundaresan et al. | |
| 2016/0112260 A1 | 4/2016 | Pai et al. | |
| 2016/0135241 A1 | 5/2016 | Gujral et al. | |
| 2016/0149805 A1 | 5/2016 | Hui et al. | |
| 2016/0174148 A1 | 6/2016 | Seed et al. | |
| 2017/0006528 A1* | 1/2017 | Bari | H04W 48/16 |

OTHER PUBLICATIONS

Final Office Action from U.S. Appl. No. 14/590,700, dated Oct. 12, 2017, 14 pages.
Final Office Action from U.S. Appl. No. 14/590,765, dated Jul. 25, 2017, 28 pages.
International Preliminary Report on Patentability for Application No. PCT/US2016/012021, dated Jul. 20, 2017, 18 pages.
Non-Final Office Action from U.S. Appl. No. 14/590,686, dated Apr. 20, 2017, 21 pages.
Non-Final Office Action from U.S. Appl. No. 14/590,700, dated Apr. 6, 2017, 19 pages.
Notice of Allowance from U.S. Appl. No. 14/590,663, dated Jul. 12, 2017, 19 pages.
Notice of Allowance from U.S. Appl. No. 14/590,686, dated Oct. 12, 2017, 9 pages.
Notice of Allowance from U.S. Appl. No. 14/590,719, dated Jun. 14, 2017, 19 pages.
Notice of Allowance from U.S. Appl. No. 14/590,799, dated Jun. 30, 2017, 16 pages.
Final Office Action from U.S. Appl. No. 14/590,663, dated Feb. 1, 2017, 16 pages.
Final Office Action from U.S. Appl. No. 141590,719, dated Feb. 2, 2017, 12 pages.
Final Office Action from U.S. Appl. No. 14/590,799, dated Feb. 1, 2017, 21 pages.
Non-Final Office Action from U.S. Appl. No. 14/590,649, dated Mar. 9, 2017, 20 pages.
Non-Final Office Action from U.S. Appl. No. 14/590,765, dated Feb. 21, 2017, 20 pages.
Final Office Action from U.S. Appl. No. 14/590,649 dated Oct. 20, 2016, 13 pages.
Non Final Office Action from U.S. Appl. No. 14/590,649 dated Jun. 3, 2016, 12 pages.
Non Final Office Action from U.S. Appl. No. 14/590,663 dated Jun. 30, 2016, 16 pages.
Non Final Office Action from U.S. Appl. No. 14/590,719 dated Jun. 30, 2016, 14 pages.
Non Final Office Action from U.S. Appl. No. 14/590,799 dated Jul. 1, 2016, 15 pages.
Notification of Transmittal of the International Search Report and Written Opinion for Application No. PCT/US2016/012021, dated Jun. 3, 2016, 22 pages.

* cited by examiner

SYSTEM AND METHOD FOR SELECTING A CELL CARRIER TO CONNECT AN IOT HUB

BACKGROUND

Field of the Invention

This invention relates generally to the field of computer systems. More particularly, the invention relates to a system and method for selecting a cell carrier to connect an IoT hub.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Another obstacle to IoT adoption is the difficulty associated with connecting and powering IoT devices. Connecting appliances such as refrigerators, garage door openers, environmental sensors, home security sensors/controllers, etc, for example, requires an electrical source to power each connected IoT device, and such an electrical source is often not conveniently located (e.g., an AC outlet is generally not found within a refrigerator).

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
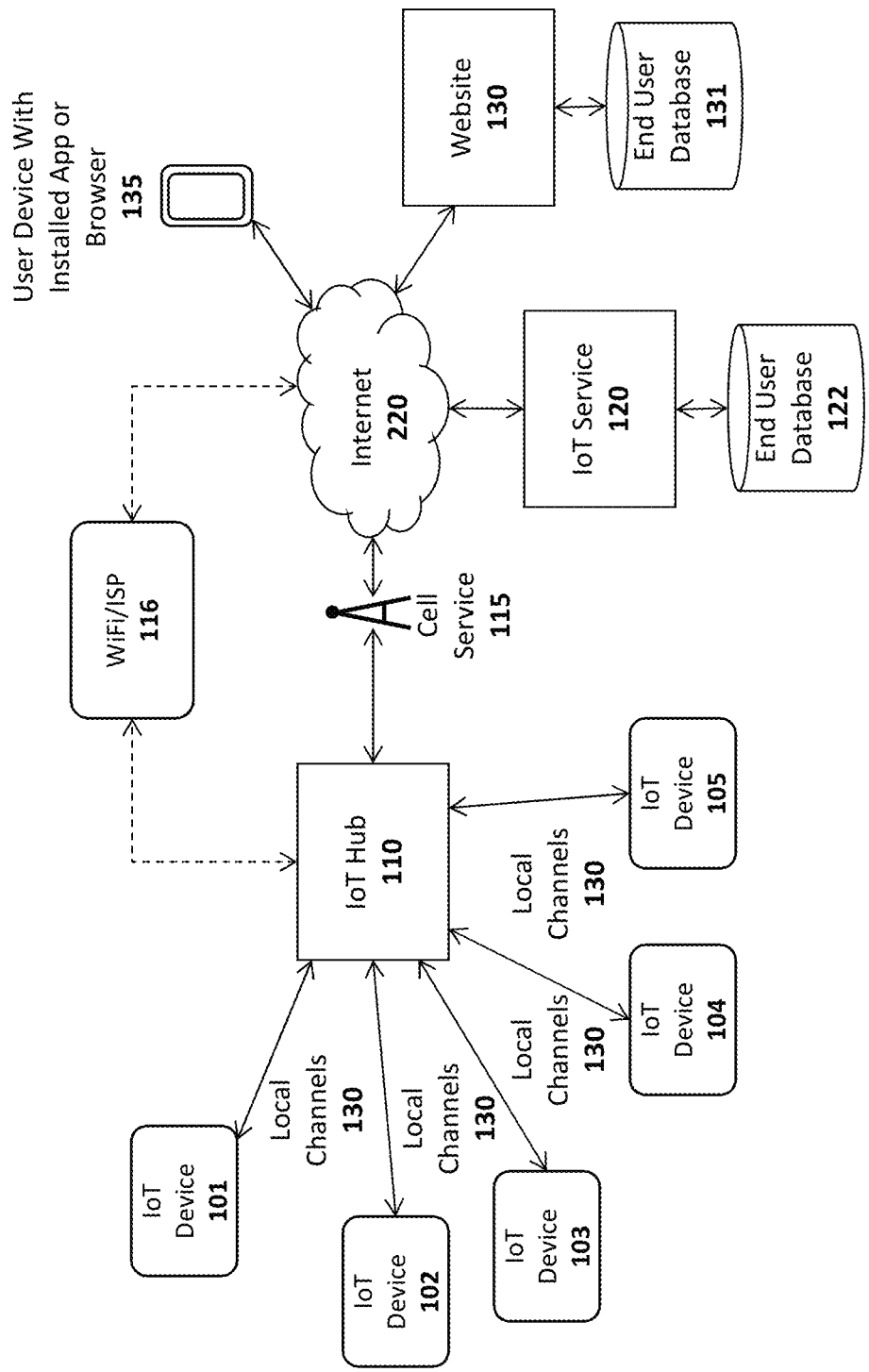
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detector, etc), the database 122 may be continually updated to store the data collected by the IoT devices 101-105. The data stored in the database 122 may then be made accessible to the end user via the IoT app or browser installed on the user's device 135

(or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
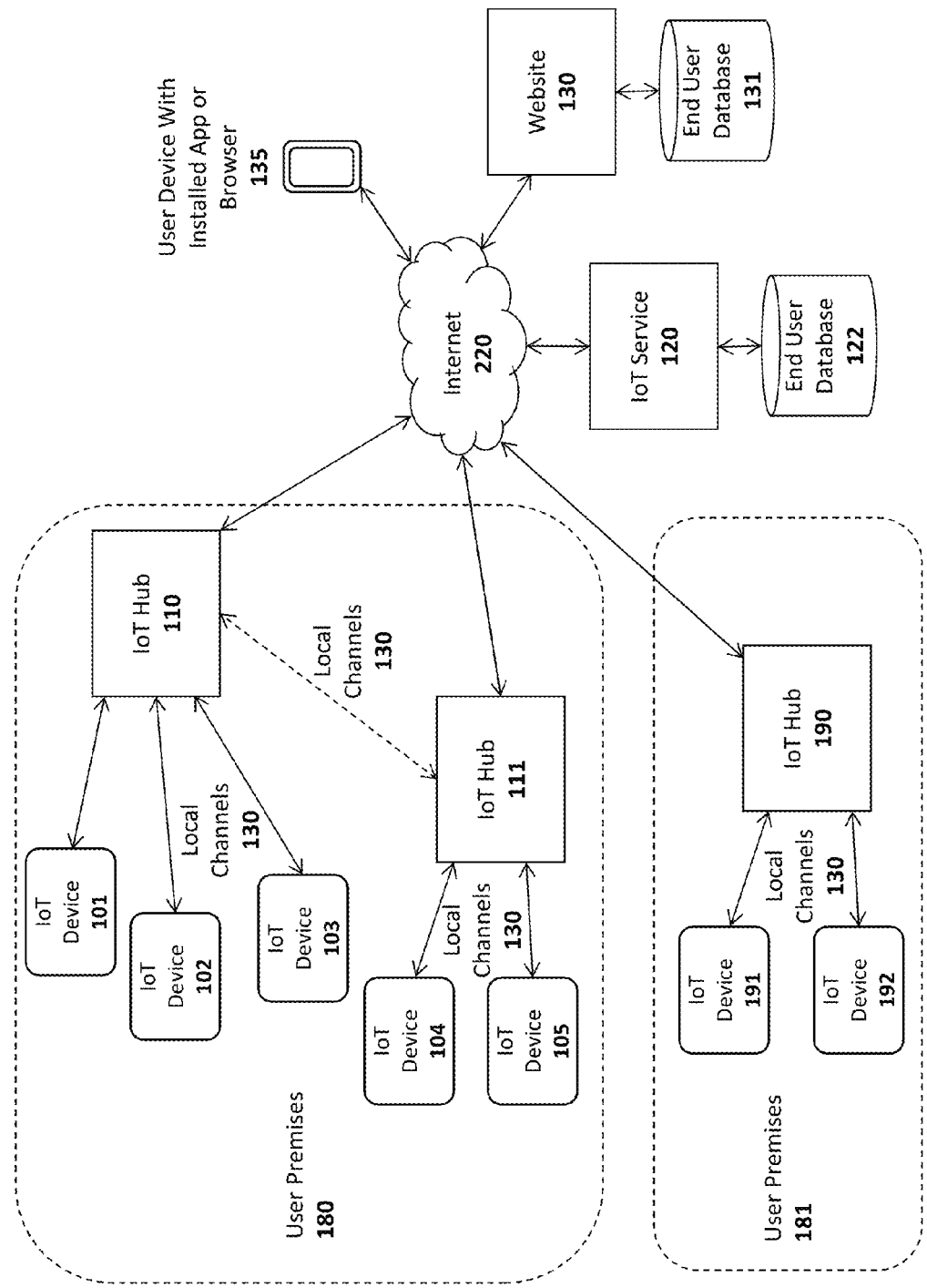

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
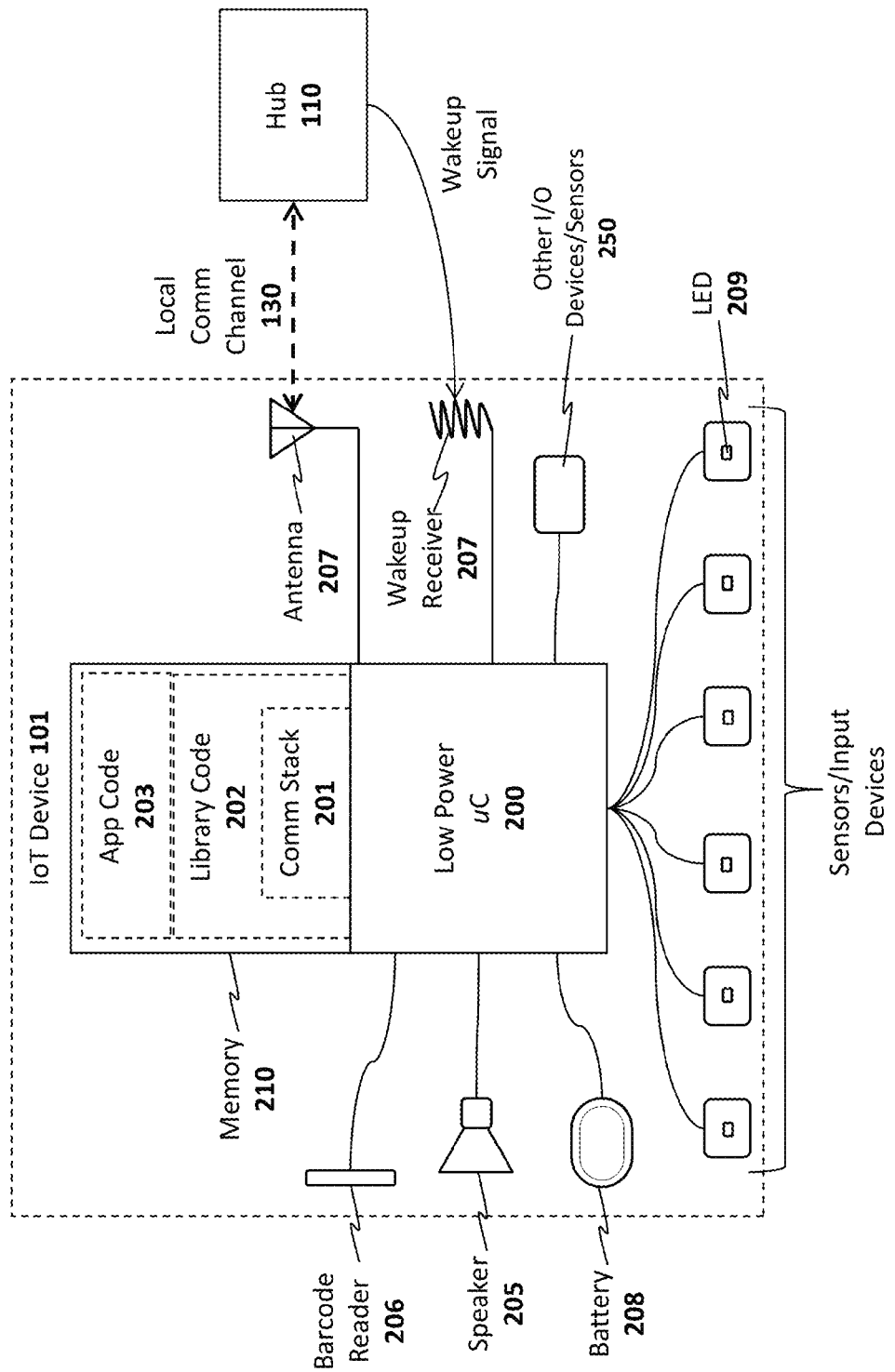
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identity module (SIM).

Figure 3:
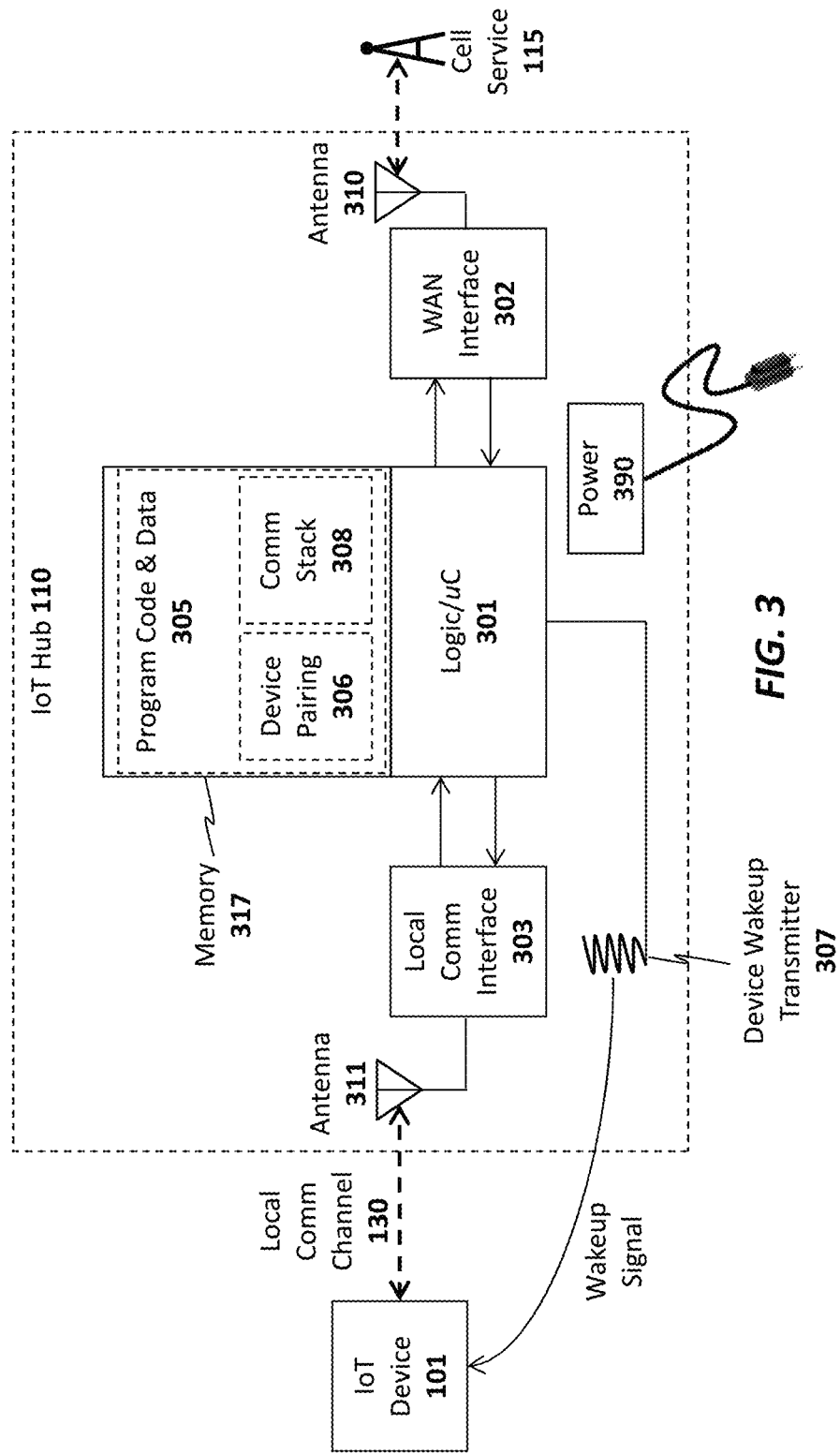
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identity module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code can be transmitted, such as via radio frequency ID (RFID) or near field communication (NFC), from the IoT device and the IoT hub has a suitable receiver to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices). In addition, in one embodiment, the SDK also includes a library code base to facilitate the design of applications and APIs which reside within the IOT Service 120 or Website 130.

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
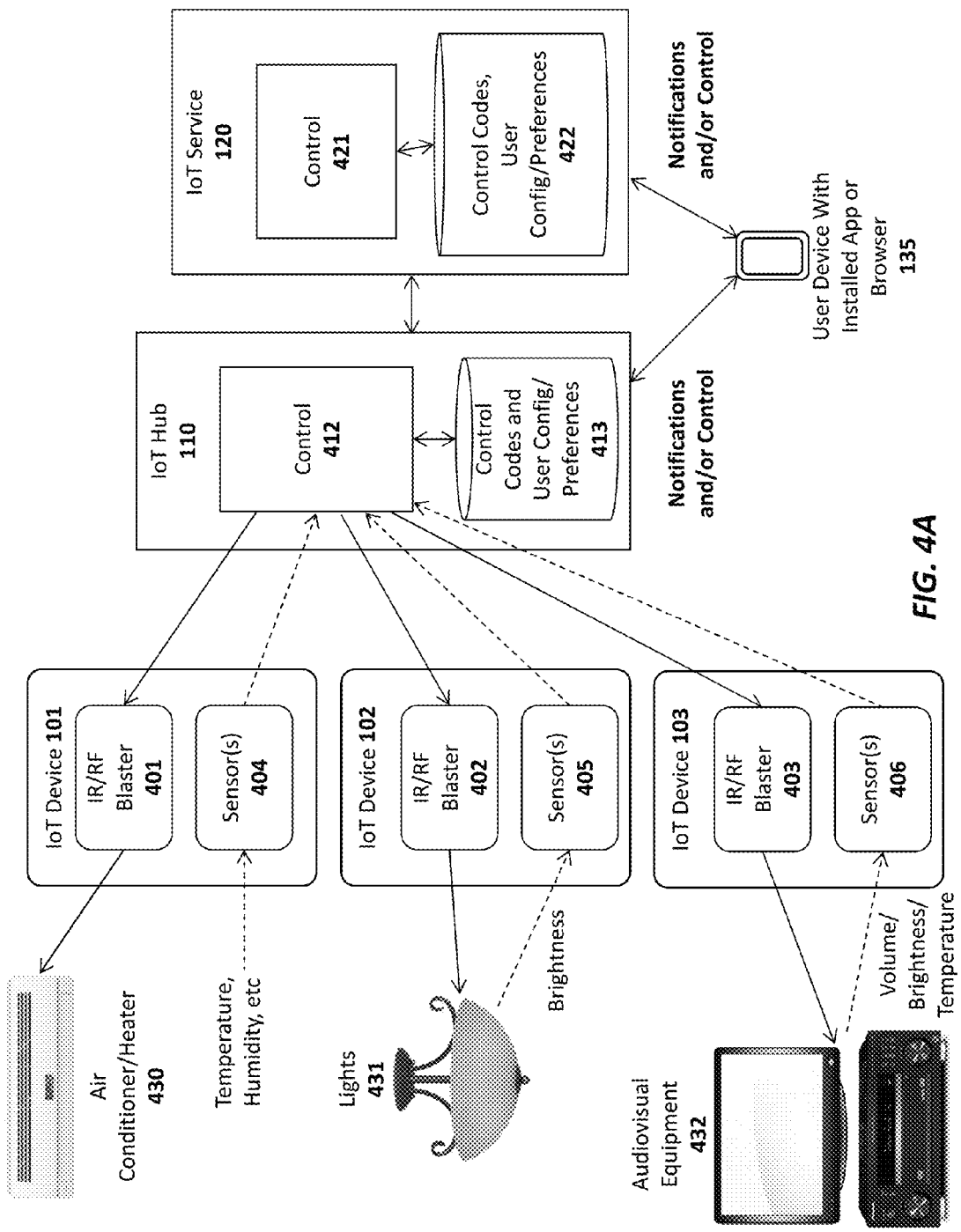
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, NV receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
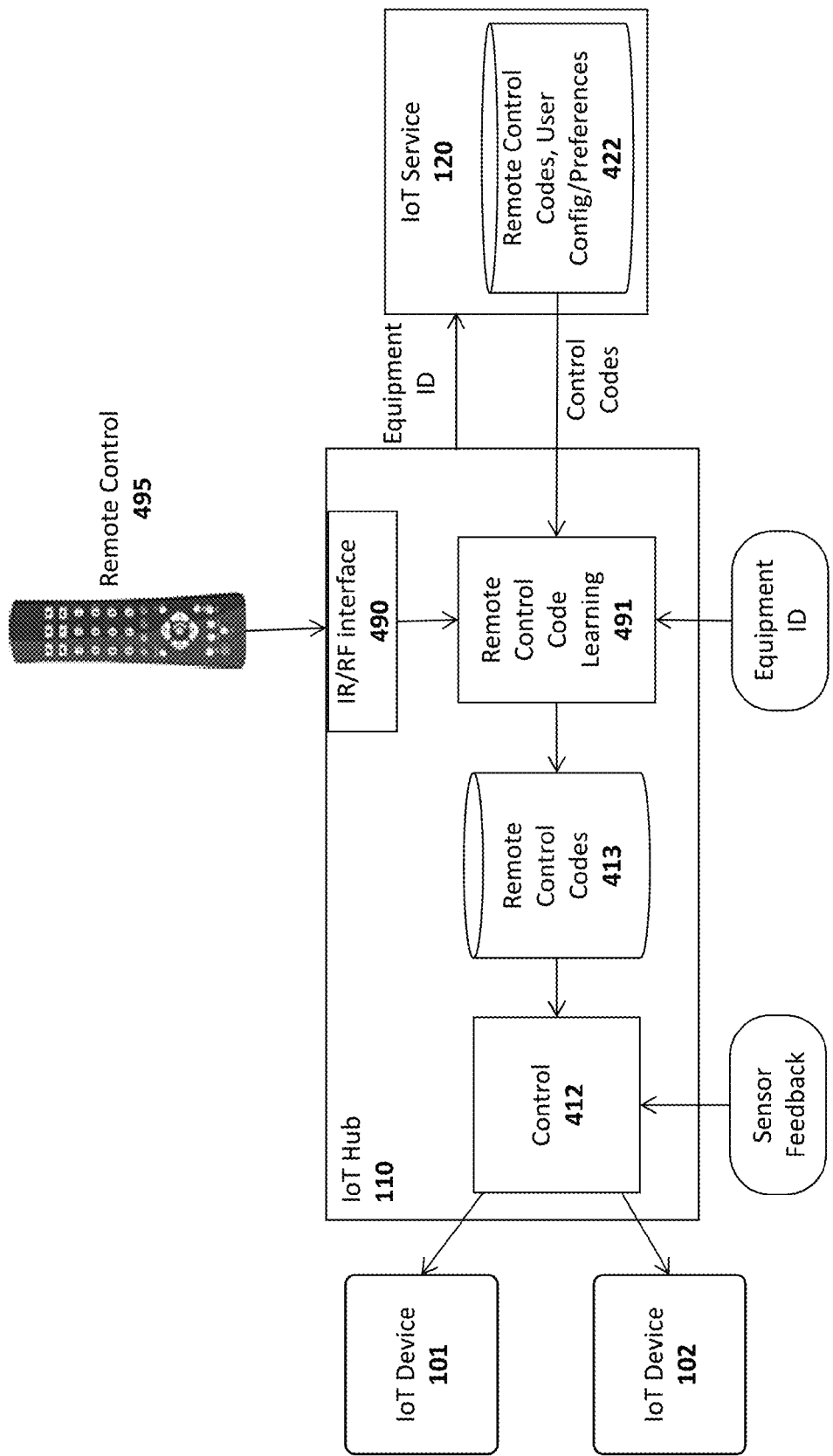

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
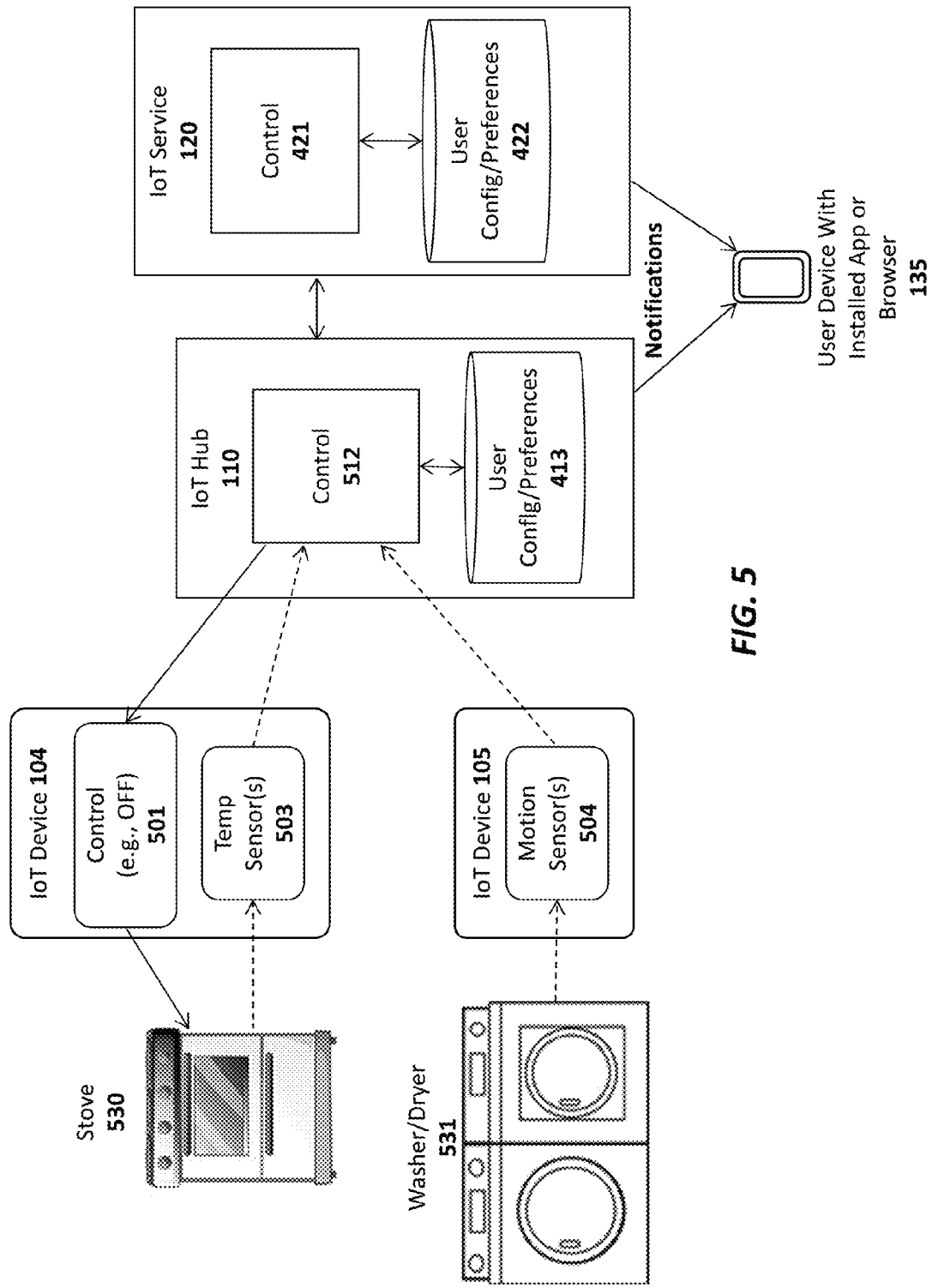
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is determined to be on for more than a threshold time period (e.g., based on the measured temperature during this time period), then control logic 512 may transmit a notification to the end user's device 135 informing the user that the stove 530 is on. In one embodiment, an app or browser-based code on the end user's device 135 displays the notification and provides the user with the ability to control the stove 530 (e.g., sending a command to turn the stove off).

In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

Figure 6:
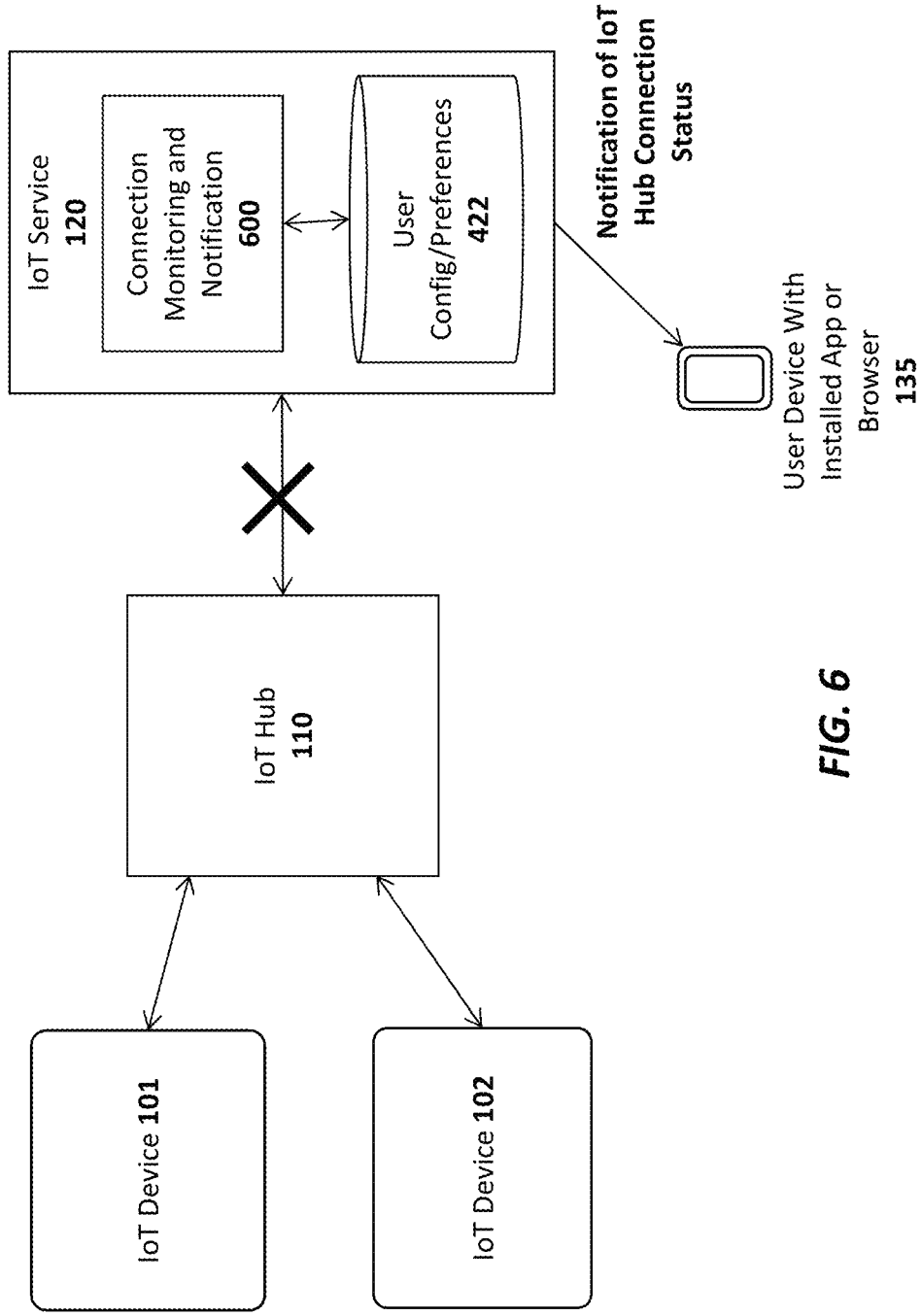
FIG. 6 illustrates embodiments of the invention for detecting loss of hub connectivity and notifying a user.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification). This feature is illustrated graphically in FIG. 6 which shows that the connection between the IoT hub 110 and IoT service 120 has been disabled. Connection monitoring and notification logic 600 on the IoT service 120 detects that the connection has been disabled and, in response, transmits a notification to the end user's device 135 (e.g., over a cellular communication channel, WiFi, or any other communication channel used by the device 135), informing the user of the connection status. In particular, in one embodiment, the connection monitoring logic detects when the first communication channel between the IoT service and the IoT hub has become inoperative and the notification logic transmits a notification to a data processing device 135 of a user responsive to the connection monitoring logic detecting that the first communication channel has become inoperative.

The user may then take steps to determine the cause of the connection problem. In an embodiment in which the IoT hub is connected via the cellular network or WiFi, the user may simply need to reboot the IoT hub device 110. In one embodiment, if the connection monitoring and notification logic 600 has not received a communication from the IoT hub for a specified period of time, it may ping the hub 110 in an attempt to determine the hub's status. After several unsuccessful attempts (i.e., without a response from the hub) it may transmit the notification to the end user's device 135.

In an embodiment in which the IoT hub is connected via both the cellular network and a broadband connection in the user's home, this mechanism may be used to detect failure of either connection, and may use the remaining good, redundant connection to maintain communication with the IoT Hub 110.

One embodiment of the IoT hub 110 is implemented with an extremely compact form factor (e.g., the size of a cell phone charger). For example, the IoT hub 110 may be packaged as a 1.5 inch (or less) cube. Various alternate sizes are also contemplated such as a depth of between 1-2 inches (or less) and a height/length of between 1-3 inches or any cube having a side of 2 inches or less.

Figure 7C:
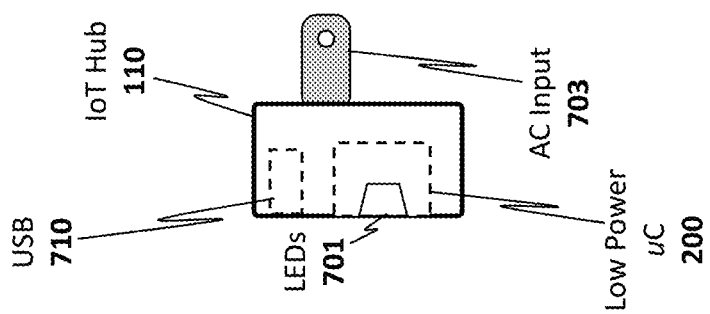
FIGS. 7A-C illustrate different embodiments of a miniature IoT hub device with LED lights and USB ports.
Figure 7B:
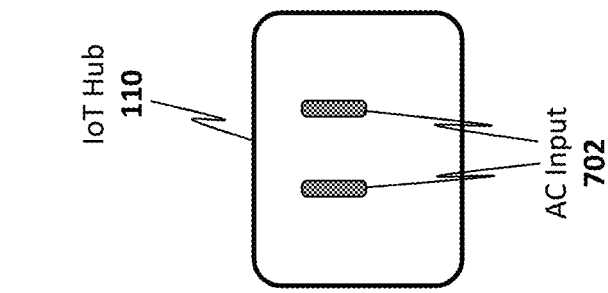
Figure 7A:
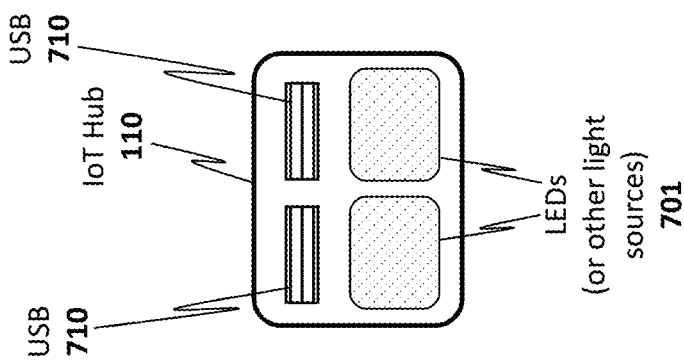

FIGS. 7A-C illustrate one particular embodiment in which the IoT hub is integrated within a small package designed to be plugged directly into an A/C outlet via A/C input interface 702. In this manner, the IoT hub 110 may be strategically positioned for ideal reception anywhere in the user's home where a power outlet exists. In one embodiment, the IoT hub 110 includes a transformer for transforming the high voltage A/C input into a lower voltage D/C signal. Although having a small form factor, in one embodiment, the IoT hub 110 includes all of the features described herein for connecting with an IoT service 120 and with a plurality of IoT devices 101-105. For example, although not explicitly shown in FIGS. 7A-C, in one embodiment, the IoT hub 110 may include multiple communication interfaces (e.g., antennas and software) for communicating with the IoT devices and IoT service. In one embodiment, the IoT hub 110 includes a powerline communication (PLC) or similar network interface for establishing communication with the IoT devices 101-105 over the A/C power lines.

In addition, the embodiment of the IoT hub shown in FIGS. 7A-C is equipped with light emitting diodes (LEDs) which, in addition to notifying the user of the current status of the hub 110, may be used for a night-light. Thus, the user may place the IoT hub in hallway, bathroom, or child's room and use the hub as a dual purpose night-light/IoT hub device.

In one embodiment, the user may program the night light feature via a programming interface on app or browser on the user's device 135. For example, the user may program the night light to come on at a particular time in the evening and to turn off at a particular time in the morning. In addition, in one embodiment, different, independently controlled colored LEDs are integrated the IoT hub. The user may program the colors to be illuminated on the IoT hub at different times of the day and evening.

Once programmed, LEDs 701 may be turned on/off by the IoT hub's integrated low power uC 200. In one embodiment, the IoT hub has an integrated photodetector to cause the night light to turn on in response to the ambient brightness falling below a specified threshold. In addition, in one embodiment, the IoT hub has one or more integrated USB ports 710 to be used for charging other devices (e.g., such as the user's mobile device 135). Of course, the underlying principles of the invention are not limited to an IoT hub 110 with integrated USB chargers.

Figure 8:
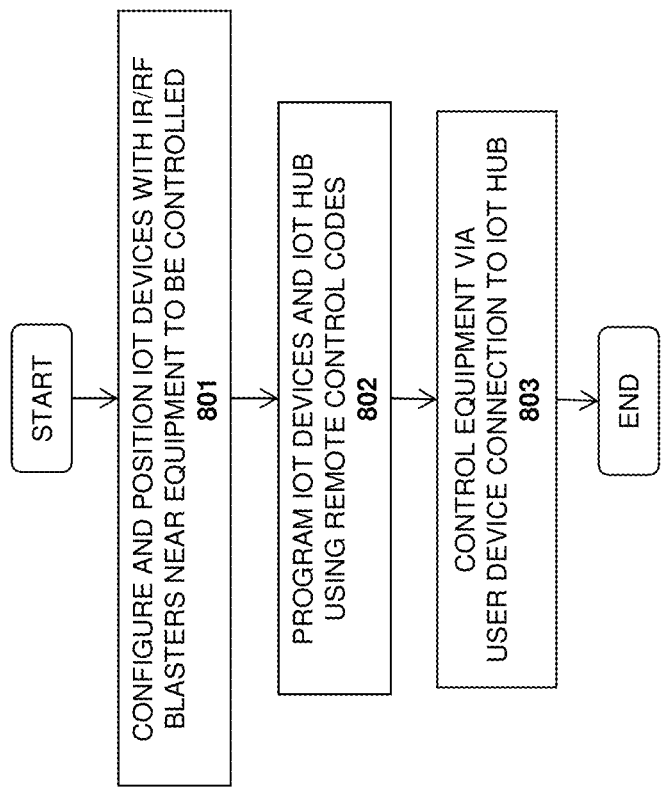
FIG. 8 illustrates a method for controlling electronics and other equipment with IoT devices.

A method in accordance with one embodiment of the invention is illustrated in FIG. 8. At 801, IoT devices are positioned/configured on or near equipment to be controlled. As mentioned, in one embodiment, the IoT devices are equipped with double-sided tape to allow the user to easily affix the IoT devices to various types of equipment. Alternatively, or in addition, each IoT device may include one or more mounting holes into which small nails or screws may be inserted to affix the IoT devices to a wall or other surface. In addition, some IoT devices may include magnetic material to allow the IoT devices to be affixed to a metal surface.

Once the IoT devices are affixed in position, they may be programmed at 802 via the user device 135 and IoT hub 110. For example, the user may connect to the IoT hub 110 with the app or browser installed on the user device 135 (either directly or through the IoT service 120). The app or browser-executable code may comprise a user interface allowing the user to identify and program each IoT device. Once the IoT device is selected, for example, the user may be provided with a list of different types of equipment from which to select (e.g., different models of remote controllable air conditioners/heaters, A/V equipment, etc). Once the correct equipment is selected, the remote control codes are stored on the IoT hub as described above and transmitted to the IR/RF blasters on the IoT devices to control the equipment at 803. In addition, as mentioned above, various automatic control functions may be implemented by the IoT hub.

In one embodiment of the invention, the IoT service 120 may enter into agreements with multiple cell carriers 901 to provide connectivity to the IoT hubs 110 in different geographical regions. For example, in the United States the IoT service 120 may have agreements with both Verizon and AT&T to provide IoT hub connectivity. Consequently, an IoT hub 110 may be in a location serviced by two or more supported cell carriers.

Figure 9:
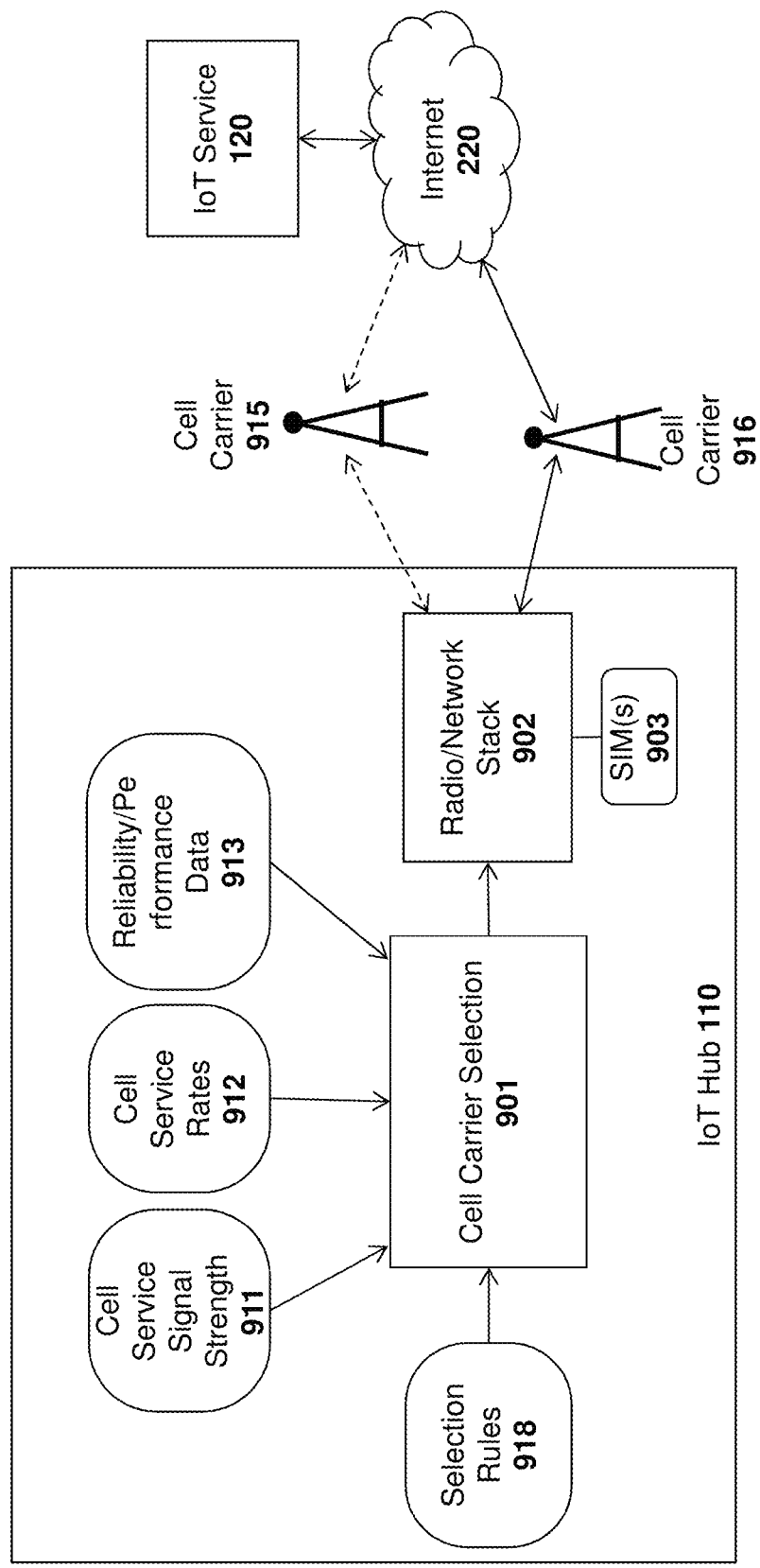
FIG. 9 illustrates one embodiment of an IoT hub for selecting between different cell carriers.

As illustrated in FIG. 9, in one embodiment of the invention, the IoT hub 901 includes cellular carrier selection logic 901 for selecting between two or more available cell carriers 915-916. In one embodiment, the cell carrier selection logic is programmed with a set of rules 918 for making the selection between the two or more cell carriers 915-916. Once a particular cell carrier has been selected, the cell carrier selection logic 901 instructs the radio/network stack 902 of the IoT hub 110 to connect with that cell carrier.

Various different types of selection rules 918 may be implemented. By way of example, if the IoT service 120 has a more beneficial agreement with a first cell carrier 915 (e.g., a lower agreed-upon rate/cost 912) compared with a second cell carrier 916, then one rule may simply be to connect with the first cell carrier 915 assuming all other variables are equal or within specified thresholds (e.g., assuming that the second cell carrier's signal strength is sufficient).

In one embodiment, the selection rules 918 implemented by the cell carrier selection logic 901 may factor in other variables related to cell carrier connectivity and cost including, for example, the current or historical signal strength 911 of each cell carrier 915-916 measured at the IoT hub 110. For example, even if the IoT service 120 has a more beneficial arrangement with the first cell carrier 915 as mentioned above, the cell carrier selection logic 901 may still connect to the second cell carrier 916 if the signal strength to the first carrier is below a specified threshold.

Similarly, the cell carrier selection logic 901 may evaluate reliability/performance data 913 of each of the cell carriers 915-916 when making a decision. For example, if the first cell carrier 915 is known to be unreliable in a particular region and/or provides significantly lower performance than the second cell carrier 916 (e.g., a reduced data rate), then the cell carrier selection logic 901 may select the second cell carrier (notwithstanding the more beneficial agreement with the first cell carrier). In one embodiment, the reliability/performance data 913 and the cell service signal strength data 911 may be collected over time by the IoT hub 110. For example, the IoT hub 110 may continually monitor signal strength, connection status, bandwidth, and other connection variables with each cell carrier 915-916 and may make connection decisions based (at least in part) on this recorded data.

In one embodiment, the IoT service 120 may provide updates to the IoT hub including new/updated selection rules 918 related to the existing cell carriers 915-916 and/or new cell carriers with which it has established agreements. For example, if the agreement between the IoT service 120 and the second cell carrier 916 is updated, resulting in a lower cost to connect through second cell carrier 916, then new selection rules 918 and/or new cell service rates 912 including this data may be transmitted from the IoT service 120 to the IoT hub 110. The cell carrier selection logic 901 may then factor in these new rules/rates when rendering cell carrier selection decisions (e.g., tending to favor connection with the second cell carrier 916 if it is more cost-effective to do so).

In one embodiment, the IoT hub 110 may be pre-provisioned by the IoT service 120 to connect with all available cell carriers 915-916 (i.e., provided with a subscriber identity module (SIM) 903 or other authentication data needed for connecting with the cell carriers 915-916). In one embodiment, a single SIM 903 (or other authentication device) may be provisioned for multiple cell carriers 915-916. Thus, after selecting a first cell carrier 915 (e.g., based on the selection rules 918 and other variables), the IoT hub 110 may still fall back to second cell carrier 916 if the first cell carrier 915 is unavailable. Similarly, the IoT hub 110 may switch from the first cell carrier 915 to the second cell carrier 916 in response to changes in current conditions (e.g., a reduction in signal strength to the first cell carrier 915 and/or a reduction in cost for the second cell carrier 916) and/or new selection rules 918 sent from the IoT service 120.

Once the IoT hub 110 is provisioned for the multiple carriers 915-916, it may dynamically switch between them throughout the day in accordance with changing parameters. For example, the cost associated with each cellular carrier 915-916 may change throughout the day (e.g., the first carrier 915 may be more expensive during heavy use periods such as rush hour and the second carrier 916 may be more expensive in the evenings). Similarly, the cell towers of one carrier may become overloaded during certain times of the day or evening, resulting in reduced connectivity. Using the techniques described herein, the cell carrier selection logic 901 may continually evaluate these conditions and dynamically switch between carriers as conditions change.

Figure 10:
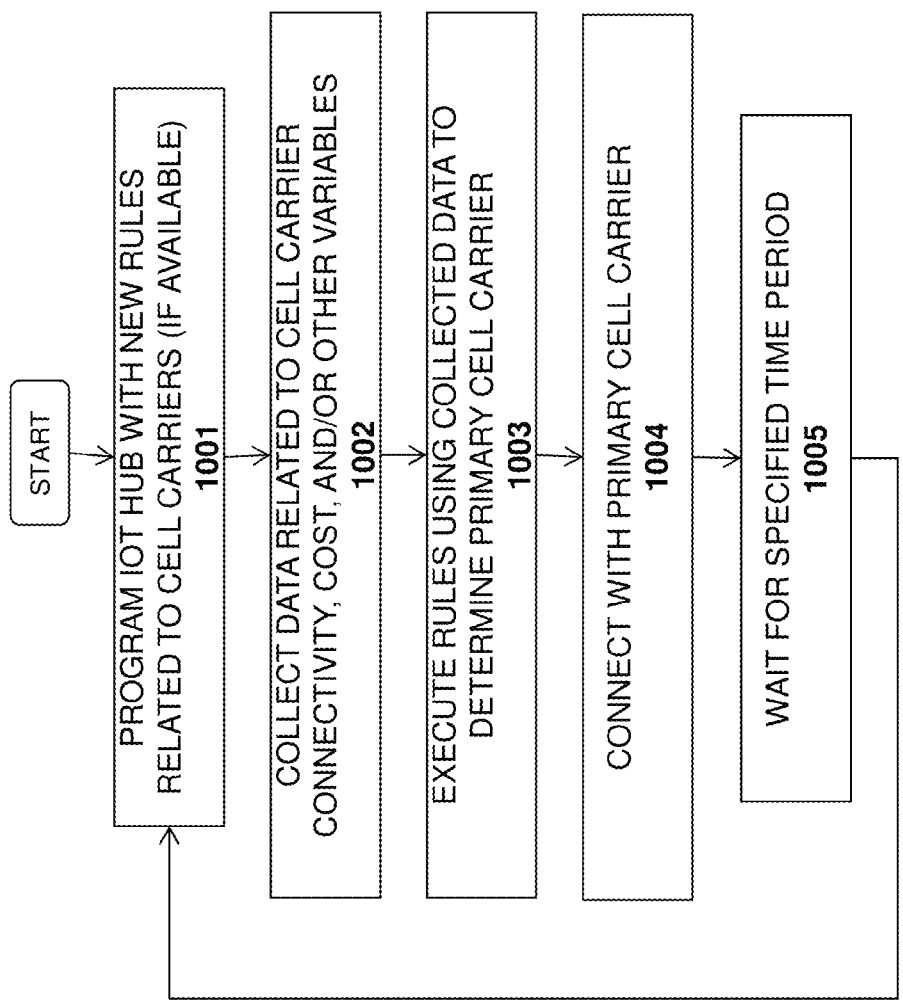
FIG. 10 illustrates one embodiment of a method for selecting between different cell carriers.

A method in accordance with one embodiment of the invention is illustrated in FIG. 10. The method may be implemented within the context of the architecture shown in FIG. 9, but is not limited to any particular system architecture.

At 1001, the IoT hub is provisioned for multiple cell carriers and programmed with rules related to connecting to the different cell carriers. For example, one rule may cause the IoT hub to connect to a first service provider over a second service provider (all other variables being equal or within defined thresholds). At 1002, data is collected related to cell carrier connectivity, cost, and/or other pertinent variables. For example, as discussed above, each cell carrier's signal strength may be used to render connection decisions.

At 1003, the rules are executed using the collected data to determine the primary cell carrier to which to connect the IoT hub. For example, all other variables being equal (or within specified thresholds), the IoT hub may initially connect with the lower cost cell carrier. As mentioned, the initial primary cell carrier may be subsequently changed in response to changes in conditions and/or new/updated rules sent from the IoT service. At 1004, the IoT hub connects with the primary cell carrier, potentially using the secondary cell carrier as a fallback connection. The IoT hub may then wait a specified time period at 1005 (e.g., an hour, day, week, etc) during which the IoT hub may collect additional data related to connectivity, cost, etc. After the delay, the process repeats and, if the rules/data has changed significantly, the IoT hub may connect with a new primary cell carrier at 1004.

Figure 11:
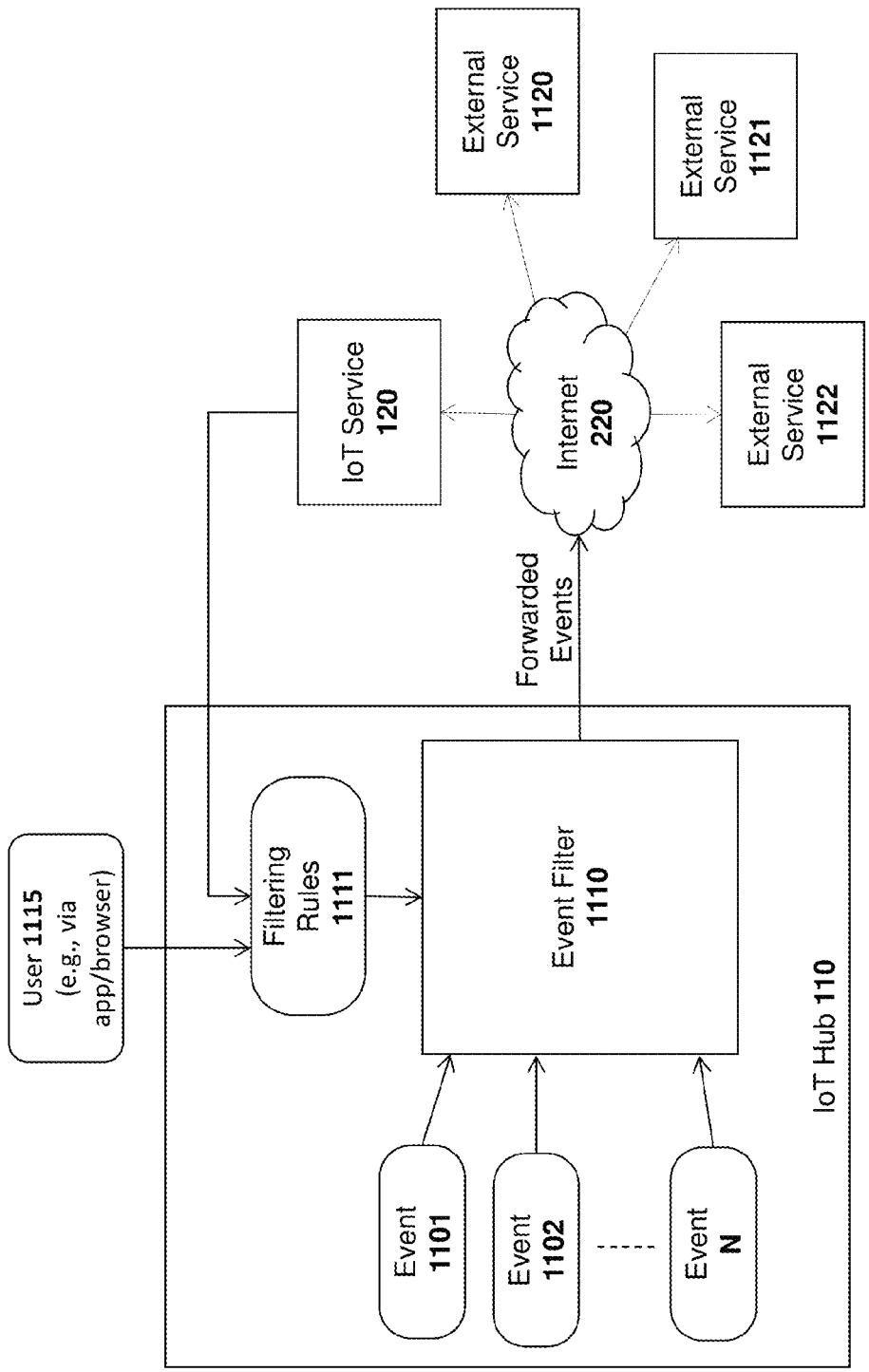
FIG. 11 illustrates one embodiment of an IoT hub filtering events from IoT devices.

As illustrated in FIG. 11, in one embodiment, various different types of events 1101, 1102-N may be generated by the IoT devices and sent to the IoT hub 110. By way of example and not limitation, the events 1101, 1102-N may include security events such as a door or window being opened in the user's home without a security code or other necessary authentication, a temperature reaching a specified threshold (e.g., indicating that a stove burner has been left on or a potential fire), a motion detector being triggered when the user and the user's family is not home, a smoke detector being triggered, a sensor on a sprinkler system indicating that the sprinkler has been running longer than a specified period of time, and a refrigerator sensor or pantry sensor indicating that the user is low on a particular food item, to name just a few.

In one embodiment, the IoT service 120 and/or one or more external services 1120-1122 may interface with the IoT hub 110 via an API to receive the events 1101, 1102-N generated by the various IoT devices and may take various actions in response to the events including sending notifications to the user 1115 (e.g., via the user's mobile device). For example, an external grocery service may receive events related to the level of different food items in the user's refrigerator or pantry and automatically update the user's online grocery list or schedule an order. An external security service may receive events related to security at the user's home and attempt to notify the user in response to an alarm. Another service may notify the fire department and/or send a notification to the user if a temperature sensor rises above a particular threshold. Note that these specific examples are provided merely for the purpose of illustration. The underlying principles of the invention are not limited to any particular type of events or event responses.

In some cases, the events generated by the IoT devices may be innocuous and may not need to be transmitted to the IoT service 120 and/or the external services 1120-1122. For example, the user's IoT thermostat device may periodically report the current temperature of the user's home and other IoT devices may periodically report events which merely indicate measurements within acceptable thresholds. Consequently, in order to reduce the number of events transmitted over the cellular carrier's network (or via the user's Internet connection), one embodiment of the IoT hub 110 includes an event filter 1110 which does not forward certain types of events to the IoT service 120 and/or external services 1120-1122. In one embodiment, each event 1101, 1102-N is assigned an identification code indicating an event type. Based on a set of filtering rules 1111 provided by the IoT service 120 and/or the end user 1115 (e.g., configured via an app/browser) certain event types are filtered out by the event filter (e.g., dropped or simply not forwarded) while other event types are stored on the IoT hub 110 and forwarded to the IoT service 120 and/or other external services 1120-1122.

As mentioned, the external services 1120-1122 and/or IoT service 120 may be configured to notify the end user of certain types of events by transmitting notifications over the Internet 220 to the user's device. For example, if a temperature sensor is above a specified threshold, the IoT service 120 may transmit a notification to the end user's device informing the user about the potential problem. In addition, in some instances, the IoT hub 110 may transmit notifications directly to the end user (in addition to sending the events directly to the IoT service 120 and/or external services 1120-1122).

In one embodiment, the external services 1120-1122 and IoT service 120 utilize an application programming interface (API) exposed by the IoT hub 110. For example, a particular service may register via the API to receive a particular set of events. Because the IoT service 120 knows which APIs (and therefore, which events), each external service 1120-1122 is configured to receive, it may dynamically send filter rules updates 1111 to cause the event filter 1110 to forward only those events which have been subscribed to by itself and the various external services 1120-1122. Depending on the configuration, the IoT hub 110 may maintain a log of all events (including those events which are not forwarded to outside services) or may simply drop events which are not forwarded.

In one embodiment, the IoT service 120 includes an event filter for filtering events in accordance with a set of filtering rules as described herein (either in addition to or instead of the event filter 1110 on the IoT hub 110). In this embodiment, each of the external services 1120-1122 may subscribe to receive certain types of events through an API exposed by the IoT service 120. Events are generated from the IoT hub 110 (possibly filtered with a local event filter 1110), sent to the IoT service 120 (potentially filtered by an IoT service filter) and forwarded to the external services 1120-1122 and/or the end user's devices. The IoT service filter may be configured in a similar manner as the IoT hub filter described herein (i.e., only forwarding certain types of events/notifications in accordance with a set of filtering rules).

The techniques for filtering events on the IoT hub 110 and/or IoT service 120 as described above is beneficial because it reduces a significant amount of unnecessary traffic over the cell carrier's network and/or the user's/service's Internet connection. These embodiments may be particularly beneficial for homes which are fully implemented with a large number of IoT devices (and which therefore general a large number of events).

Figure 12:
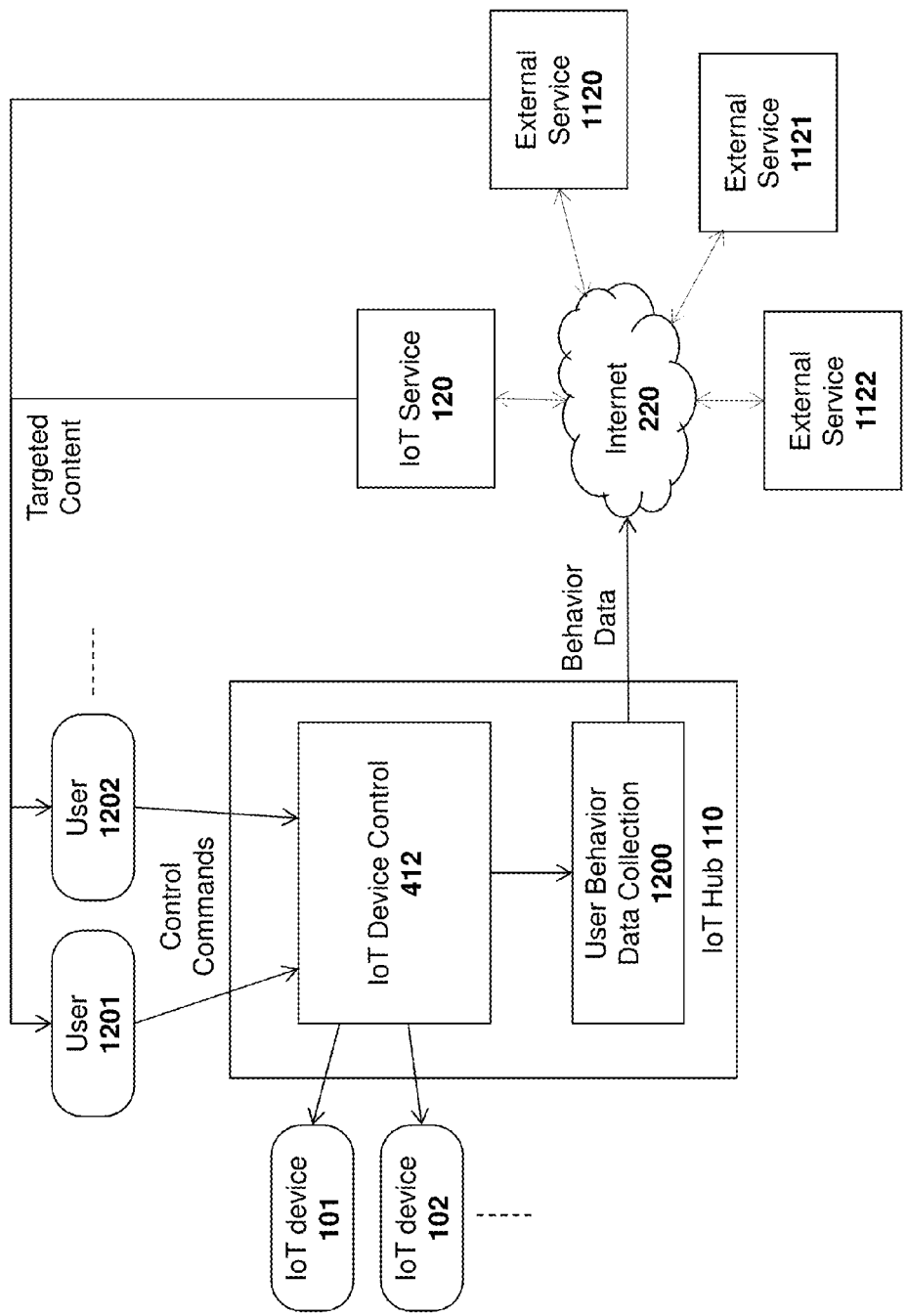
FIG. 12 illustrates one embodiment of an IoT hub collecting data related to user behavior within an IoT system.

One embodiment of the invention collects user behavior data related to each user's interaction with the various IoT devices and responsively provides targeted content updates uniquely tailored to the interests of each user. FIG. 12 illustrates an exemplary embodiment in which two users 1201-1202 control IoT devices 101-102, in a home via IoT device control logic 412 on the IoT hub 110. While, only two IoT devices 101-102 and two users 1201-1202 are shown for simplicity, there may be many more IoT devices and/or users communicatively coupled via the IoT hub 110. As mentioned, the users 1201-1201 may interact with the IoT devices 101-102 via an app or browser installed on each user's data processing device (e.g., a smartphone, personal computer, etc). As mentioned, the app may be specifically designed to interface with the IoT service 120 and/or the IoT hub 110 to allow the user to review data provided from the various IoT devices 101-102 and to control the IoT devices 101-102.

In one embodiment, user behavior data collection logic 1200 executed on the IoT hub 110 monitors and collects the information viewed by each user (e.g., information provided by the various IoT devices 101-102) as well as the IoT devices controlled by each user. For example, one of the two users 1201-1202 may be a gardener and may periodically review data related to the amount of water consumed in the garden (collected via sensors on an IoT device). This user may also control the sprinkler system via the IoT device, for example, by programming the IoT device control 412 to control the IoT device to automatically turn the sprinkler system on and off. The other user may not be involved with gardening but may do the laundry and/or cook in the home.

Information related to each of these activities may be collected via the user behavior data collection logic 1200 to generate a user profile for each user. For example, in one embodiment, the behavior data is sent from the IoT hub 110 to the IoT service 120 where it is analyzed to determine each user's preferences. Targeted content may then be transmitted to each individual user 1201-1202 in accordance with these preferences. For example, the user who gardens may receive information related to sales on gardening supplies and the user who cooks may receive information related to kitchen appliances and/or recipes. In one embodiment, the owner/operator of the IoT service 120 may enter into arrangements with online advertising companies to generate the targeted information for transmission to each of the user's data processing devices. In one embodiment, the IoT service 120 sends the user behavior data to one or more external services 1120-1122 which then generate targeted notifications and content to the end user's data processing device.

In one embodiment, user behavior data is also collected directly from the IoT Service 120 or one of the External Services 1120-1122. For example, a user's purchases and other activities outside the context of the IoT system may be recorded at the IoT service 120 and/or external services 1120-1122 and may be used to as part of the analysis to determine the targeted notifications/content.

This type of micro-targeting has not been previously performed because the specific real-world behaviors captured via the IoT system described herein were not previously available. For example, current targeted advertising is based on a user's browsing history and/or purchase history, but no data is available related to a user's real-world activity (e.g., such as gardening, cooking, and home maintenance). Such data can be particularly beneficial when providing targeted information to end users as described herein because it is based on a user's actual activity related to particular products and/or services.

In one embodiment, the low power microcontroller 200 of each IoT device 101 and the low power logic/microcontroller 301 of the IoT hub 110 include a secure key store for storing encryption keys used by the embodiments described below (see, e.g., FIGS. 13-15 and associated text). Alternatively, the keys may be secured in a subscriber identity module (SIM) as discussed below.

Figure 13:
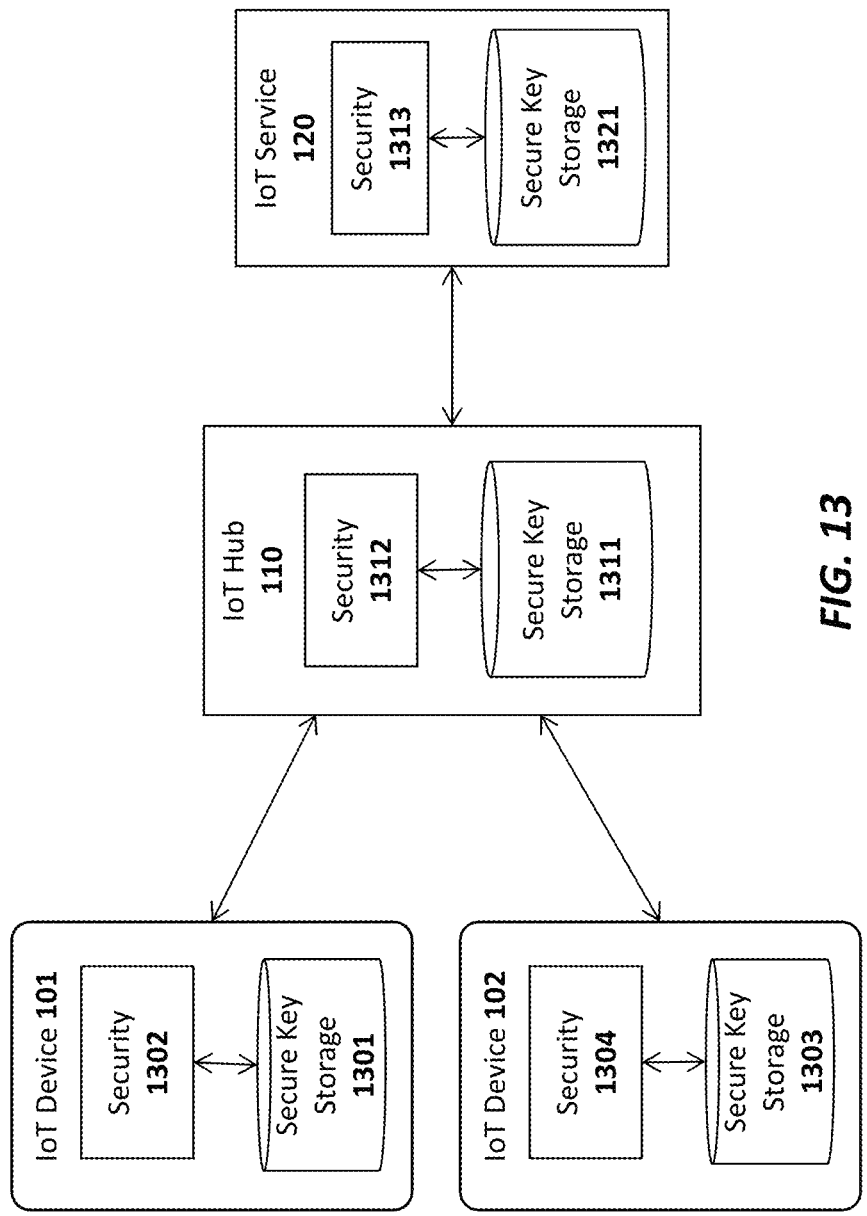
FIG. 13 illustrates a high level view of one embodiment of a security architecture.

FIG. 13 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1301, 1303, respectively, for securely storing each device's private key. Security logic 1302, 1304 then utilizes the securely stored private keys to perform the encryption/decryption operations described herein. Similarly, the IoT hub 110 includes a secure storage 1311 for storing the IoT hub private key and the public keys of the IoT devices 101-102 and the IoT service 120; as well as security logic 1312 for using the keys to perform encryption/decryption operations. Finally, the IoT service 120 may include a secure storage 1321 for security storing its own private key, the public keys of various IoT devices and IoT hubs, and a security logic 1313 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in its secure key store 1311.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1313 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with its private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1312 in the IoT hub is trusted, the service 120 could negotiate a session key with the hub security module 1312 and then the security module 1312 would negotiate a session key with each device 120. Messages from the service 120 would then be decrypted and verified in the hub security module 1312 before being re-encrypted for transmission to the device 101.

In one embodiment, to prevent a compromise on the hub security module 1312 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101.

The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with its private key so that the receiving device can verify its authenticity.

A different set of keys may be used to encrypt communication from the IoT device 101 to the IoT hub 110 and to the IoT service 120. For example, using a public/private key arrangement, in one embodiment, the security logic 1302 on the IoT device 101 uses the public key of the IoT hub 110 to encrypt data packets sent to the IoT hub 110. The security logic 1312 on the IoT hub 110 may then decrypt the data packets using the IoT hub's private key. Similarly, the security logic 1302 on the IoT device 101 and/or the security logic 1312 on the IoT hub 110 may encrypt data packets sent to the IoT service 120 using the public key of the IoT service 120 (which may then be decrypted by the security logic 1313 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 14:
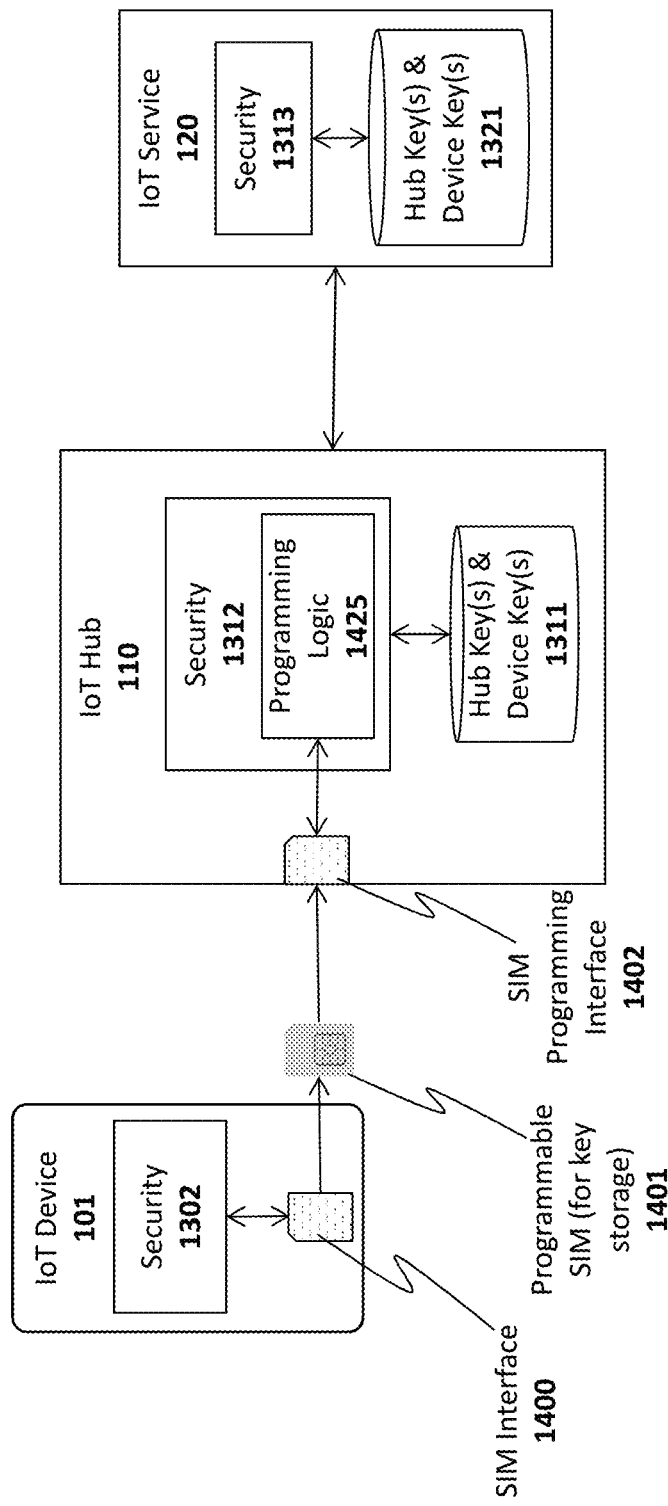
FIG. 14 illustrates one embodiment of an architecture in which a subscriber identity module (SIM) is used to store keys on IoT devices.

As illustrated in FIG. 14, in one embodiment, the secure key storage on each IoT device 101 is implemented using a programmable subscriber identity module (SIM) 1401. In this embodiment, the IoT device 101 may initially be provided to the end user with an un-programmed SIM card 1401 seated within a SIM interface 1400 on the IoT device 101. In order to program the SIM with a set of one or more encryption keys, the user takes the programmable SIM card 1401 out of the SIM interface 500 and inserts it into a SIM programming interface 1402 on the IoT hub 110. Programming logic 1425 on the IoT hub then securely programs the SIM card 1401 to register/pair the IoT device 101 with the IoT hub 110 and IoT service 120. In one embodiment, a public/private key pair may be randomly generated by the programming logic 1425 and the public key of the pair may then be stored in the IoT hub's secure storage device 411 while the private key may be stored within the programmable SIM 1401. In addition, the programming logic 1425 may store the public keys of the IoT hub 110, the IoT service 120, and/or any other IoT devices 101 on the SIM card 1401 (to be used by the security logic 1302 on the IoT device 101 to encrypt outgoing data). Once the SIM 1401 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 14 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1402 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 15A:
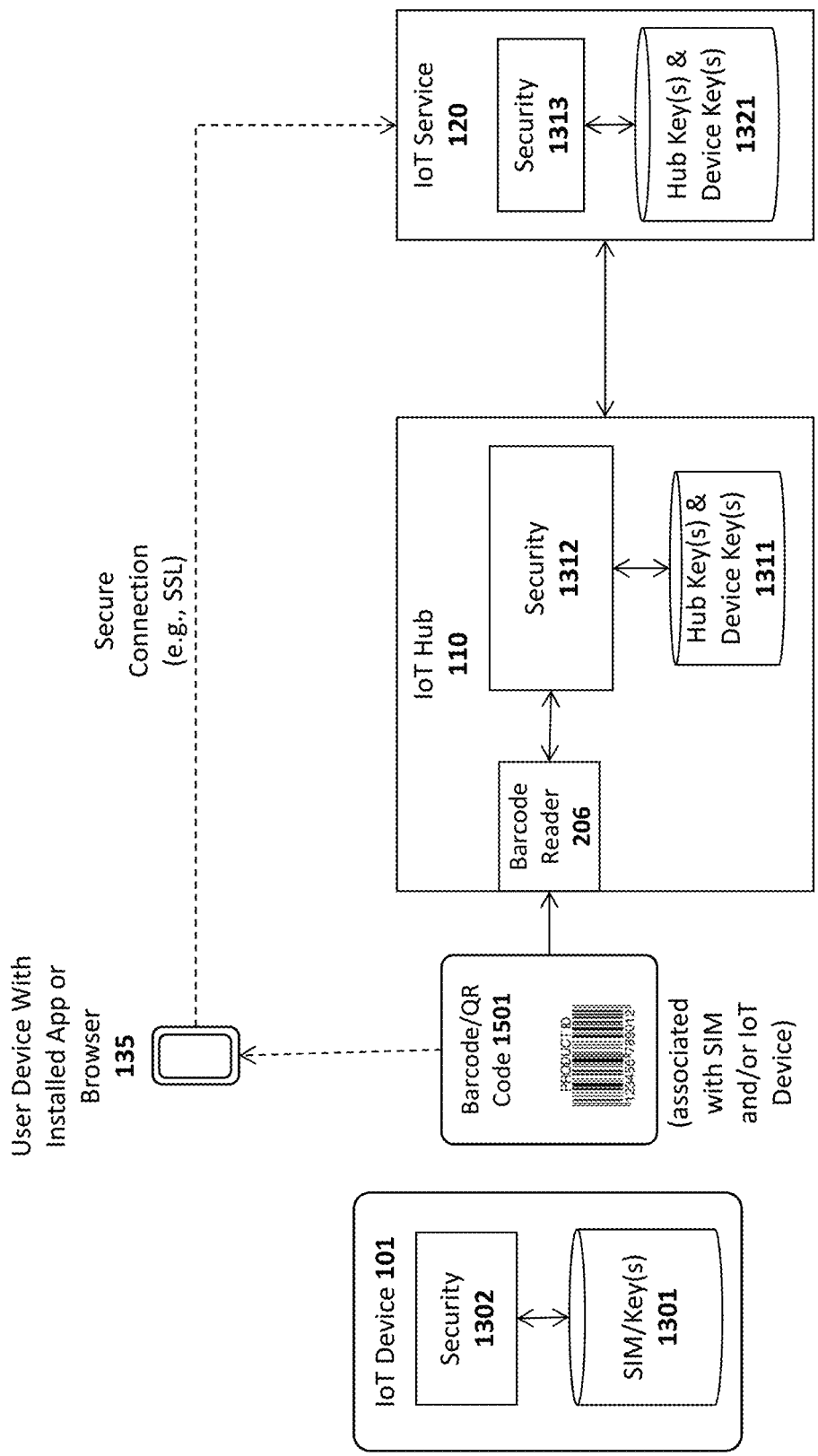
FIG. 15A illustrates one embodiment in which IoT devices are registered using barcodes or QR codes.

For example, as illustrated in FIG. 15A each IoT device 101 or SIM 401 may be packaged with a barcode or QR code 1501 uniquely identifying the IoT device 101 and/or SIM 1401. In one embodiment, the barcode or QR code 1501 comprises an encoded representation of the public key for the IoT device 101 or SIM 1401. Alternatively, the barcode or QR code 1501 may be used by the IoT hub 110 and/or IoT service 120 to identify or generate the public key (e.g., used as a pointer to the public key which is already stored in secure storage). The barcode or QR code 1501 may be printed on a separate card (as shown in FIG. 15A) or may be printed directly on the IoT device itself. Regardless of where the barcode is printed, in one embodiment, the IoT hub 110 is equipped with a barcode reader 206 for reading the barcode and providing the resulting data to the security logic 1312 on the IoT hub 110 and/or the security logic 1313 on the IoT service 120. The security logic 1312 on the IoT hub 110 may then store the public key for the IoT device within its secure key storage 1311 and the security logic 1313 on the IoT service 120 may store the public key within its secure storage 1321 (to be used for subsequent encrypted communication).

In one embodiment, the data contained in the barcode or QR code 1501 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1302 on the IoT device 101 and the security logic 1312 on the IoT hub 110 may be implemented using hardware, software, firmware or any combination thereof. For example, in one embodiment, the security logic 1302, 1312 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1302, 1312, in one embodiment, the security logic 1302, 1312 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 15B:
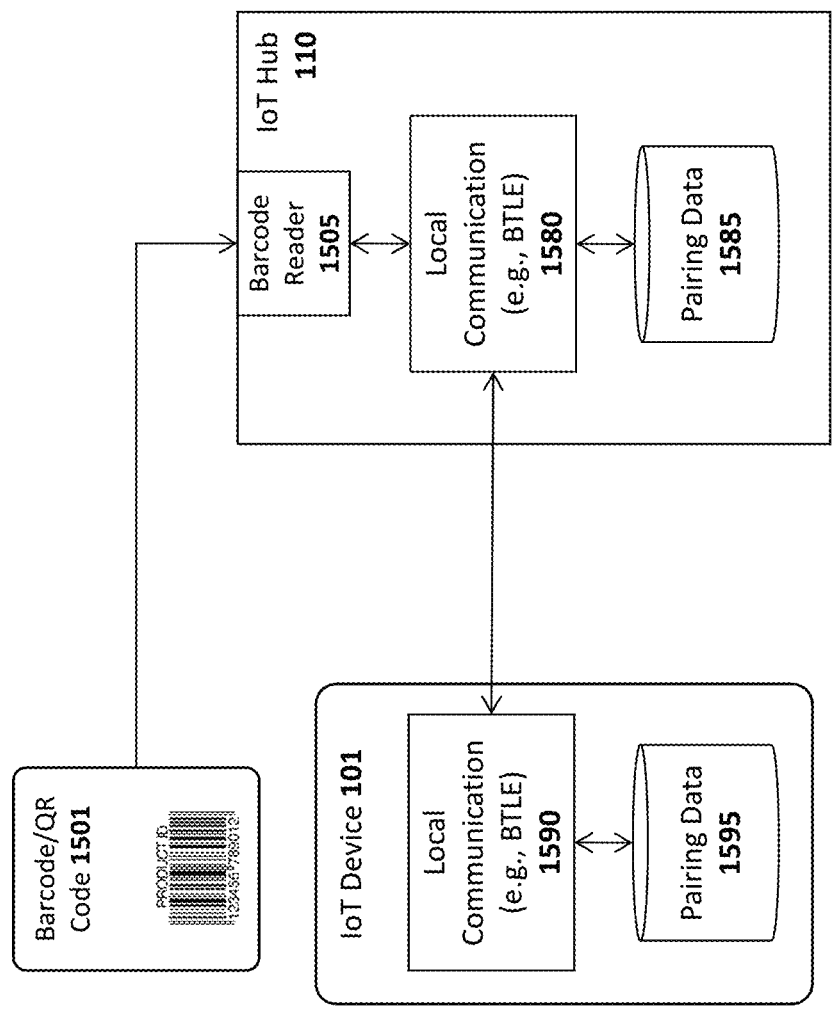
FIG. 15B illustrates one embodiment in which pairing is performed using barcodes or QR codes.

FIG. 15B illustrates one embodiment in which the barcode reader 206 on the IoT hub 110 captures the barcode/QR code 1501 associated with the IoT device 101. As mentioned, the barcode/QR code 1501 may be printed directly on the IoT device 101 or may be printed on a separate card provided with the IoT device 101. In either case, the barcode reader 206 reads the pairing code from the barcode/QR code 1501 and provides the pairing code to the local communication module 1580. In one embodiment, the local communication module 1580 is a Bluetooth LE chip and associated software, although the underlying principles of the invention are not limited to any particular protocol standard. Once the pairing code is received, it is stored in a secure storage containing pairing data 1585 and the IoT device 101 and IoT hub 110 are automatically paired. Each time the IoT hub is paired with a new IoT device in this manner, the pairing data for that pairing is stored within the secure storage 1585. In one embodiment, once the local communication module 1580 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1595 may include the pre-programmed pairing code identified in the barcode/QR code 1501. The pairing data 1595 may also include pairing data received from the local communication module 1580 on the IoT hub 110 required for establishing a secure local communication channel (e.g., an additional key to encrypt communication with the IoT hub 110).

Thus, the barcode/QR code 1501 may be used to perform local pairing in a far more secure manner than current wireless pairing protocols because the pairing code is not transmitted over the air. In addition, in one embodiment, the same barcode/QR code 1501 used for pairing may be used to identify encryption keys to build a secure connection from the IoT device 101 to the IoT hub 110 and from the IoT hub 110 to the IoT service 120.

Figure 16:
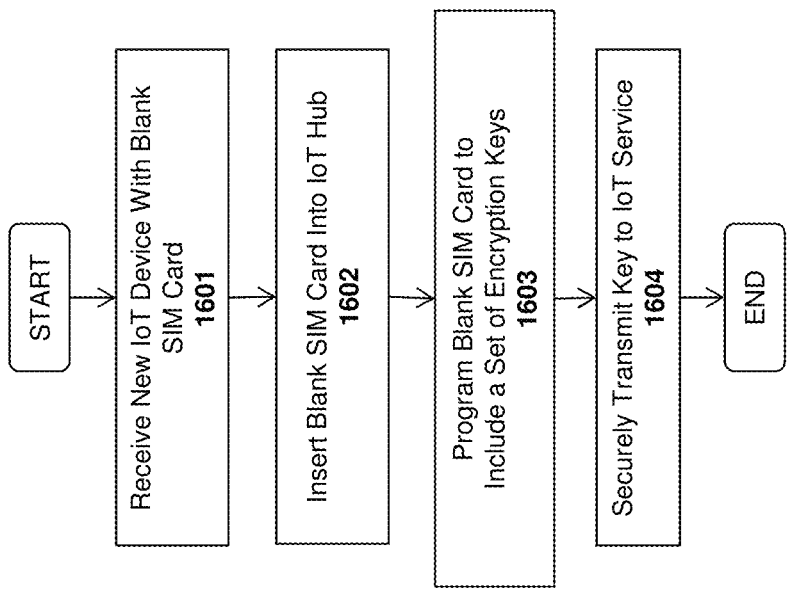
FIG. 16 illustrates one embodiment of a method for programming a SIM using an IoT hub.

A method for programming a SIM card in accordance with one embodiment of the invention is illustrated in FIG. 16. The method may be implemented within the system architecture described above, but is not limited to any particular system architecture.

At 1601, a user receives a new IoT device with a blank SIM card and, at 1602, the user inserts the blank SIM card into an IoT hub. At 1603, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1604, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 16.

Figure 17:
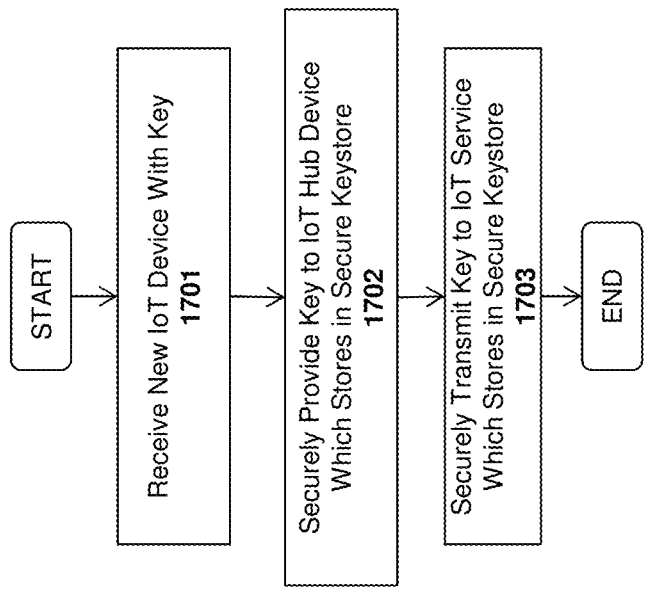
FIG. 17 illustrates one embodiment of a method for registering an IoT device with an IoT hub and IoT service.

A method for integrating a new IoT device into a network is illustrated in FIG. 17. The method may be implemented within the system architecture described above, but is not limited to any particular system architecture.

At 1701, a user receives a new IoT device to which an encryption key has been pre-assigned. At 1702, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or browser. In an alternate embodiment, a secure communication channel such as a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1703, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 18:
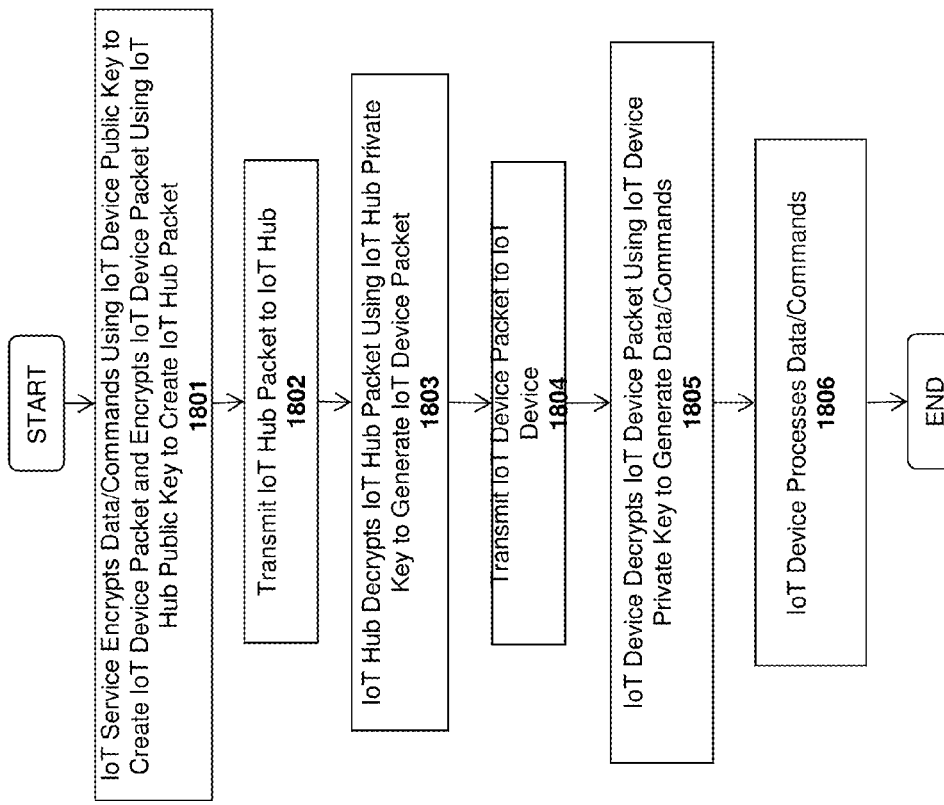
FIG. 18 illustrates one embodiment of a method for encrypting data to be transmitted to an IoT device.

A method for securely communicating commands/data to an IoT device using public/private keys is illustrated in FIG. 18. The method may be implemented within the system architecture described above, but is not limited to any particular system architecture.

At 1801, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1802, the IoT service transmits the IoT hub packet to the IoT hub. At 1803, the IoT hub decrypts the IoT hub packet using the IoT hub's private key to generate the IoT device packet. At 1804 it then transmits the IoT device packet to the IoT device which, at 1805, decrypts the IoT device packet using the IoT device private key to generate the data/commands. At 1806, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
   an Internet of Things (IoT) hub comprising a network interface to couple the IoT hub to an IoT service through a cellular (cell) carrier, the IoT hub further comprising a local communication interface to communicatively couple the IoT hub to a plurality of IoT devices over local communication channels;
   cell carrier selection logic on the IoT hub to implement a set of rules to select between two or more cell carriers through which to connect the IoT hub to the IoT service, the rules being based, at least in part, on a cost associated with connecting to each of the two or more cell carriers and connectivity data associated with cell connections between the IoT hub and each of the two or more cell carriers, and the rules are periodically updated on the IOT hub from the IoT service to reflect changes in established agreements between the IoT service and at least one of the cell carriers and/or new agreements between the IoT service and a new cell carrier.

2. The system as in claim 1 wherein upon selecting a first cell carrier, the cell carrier selection logic is to cause the network interface to connect the IoT hub to the first cell carrier.

3. The system as in claim 1 wherein the connectivity data comprises signal strength between the IoT hub and each of the cell carriers.

4. The system as in claim 3 wherein the connectivity data further comprises reliability and/or performance data associated with connections between the IoT hub and each of the cell carriers.

5. The system as in claim 3 wherein the rules specify that the cell carrier selection logic is to connect with the lowest cost cell carrier as long as the connectivity data indicates that the signal strength and/or other connectivity variables associated with the lowest cost cell carrier are above specified thresholds.

6. The system as in claim 1 wherein the IoT hub is pre-provisioned with the ability to connect to each of the two or more cell carriers.

7. The system as in claim 1 wherein the local communication channels comprise Bluetooth Low Energy (LE) communication channels.

8. The system as in claim 7 wherein one or more of the IoT devices comprise an IR or RF blaster to control different types of electronics equipment via IR or RF communication with the electronics equipment, each IoT device further comprising at least one sensor to detect current conditions associated with the operation of the different electronics equipment, each IoT device to transmit an indication of the current conditions to the IoT hub over the wireless communication channel.

9. A method comprising:
   programming an IoT hub with rules related to connecting to an IoT service through one of a plurality of cellular (cell) carriers including rules related to cell carrier cost and/or connectivity;
   periodically updating rules on the IOT hub from the IoT service to reflect changes in established agreements between the IoT service and at least one of the cell carriers and/or new agreements between the IoT service and a new cell carrier
   collecting data related to cell carrier cost and/or connectivity;
   executing the rules using the collected data to determine a primary cell carrier over which to connect the IoT hub; and
   connecting the IoT hub to the primary cell carrier.

10. The method as in claim 9 wherein upon selecting a first cell carrier, the cell carrier selection logic is to cause the network interface to connect the IoT hub to the first cell carrier.

11. The method as in claim 9 wherein the connectivity data comprises signal strength between the IoT hub and each of the cell carriers.

12. The method as in claim 11 wherein the connectivity data further comprises reliability and/or performance data associated with connections between the IoT hub and each of the cell carriers.

13. The method as in claim 11 wherein the rules specify that the cell carrier selection logic is to connect with the lowest cost cell carrier as long as the connectivity data indicates that the signal strength and/or other connectivity variables associated with the lowest cost cell carrier are above specified thresholds.

14. The method as in claim 9 wherein the IoT hub is pre-provisioned with the ability to connect to each of the two or more cell carriers.

15. The method as in claim 9 wherein the local communication channels comprise Bluetooth Low Energy (LE) communication channels.

16. The method as in claim 15 wherein one or more of the IoT devices comprise an IR or RF blaster to control different types of electronics equipment via IR or RF communication with the electronics equipment, each IoT device further comprising at least one sensor to detect current conditions associated with the operation of the different electronics equipment, each IoT device to transmit an indication of the current conditions to the IoT hub over the wireless communication channel.

* * * * *